United States Patent [19]

Schiessle et al.

[11] Patent Number: 4,955,241
[45] Date of Patent: Sep. 11, 1990

[54] MAGNETOELASTIC FORCE-MEASURING DEVICE

[75] Inventors: Edmund Schiessle, Schorndorf; Khaldoun Alasafi, Schwabisch Gmund, both of Fed. Rep. of Germany

[73] Assignee: Daimler-Benz AG, Fed. Rep. of Germany

[21] Appl. No.: 361,317

[22] Filed: Jun. 5, 1989

[30] Foreign Application Priority Data

Jun. 4, 1988 [DE] Fed. Rep. of Germany ....... 3819083

[51] Int. Cl.$^5$ .............................................. G01L 1/12
[52] U.S. Cl. .................. 73/862.69; 324/209; 336/20
[58] Field of Search ............. 73/862.69, 779, DIG. 2; 324/209; 336/20

[56] References Cited

U.S. PATENT DOCUMENTS 1,906,551  5/1933  DeForest ............... 73/862.69 X
4,802,368  2/1989  Nordvall ................. 73/862.69

FOREIGN PATENT DOCUMENTS 1030597  6/1953  France ................. 73/862.69

Primary Examiner—Charles A. Ruehl
Attorney, Agent, or Firm—Evenson, Wands, Edwards, Lenahan & McKeown

[57] ABSTRACT

A magnetoelastic force-measuring device is proposed which has an annular thrust body possessing magnetostrictive properties and bearing a ring coil. To enhance the measuring sensitivity in conjunction with simultaneous good thermal error compensation, a sleeved tension body, likewise possessing magnetostrictive properties and bearing a ring coil, is arranged coaxially in the annular thrust body to fit in such a way that, given the introduction of a force, the one body is subjected to thrust and the other to tension. In this connection, the magnetostrictive properties are formed by a soft magnetic measuring film—preferably of amorphous metal—which applied in each case to the body, and the two ring coils are connected up to make an inductive half-bridge.

15 Claims, 2 Drawing Sheets

MAGNETOELASTIC FORCE-MEASURING DEVICE

BACKGROUND AND SUMMARY OF THE INVENTION

The invention relates to a magnetoelastic force-measuring device of the type comprising a metallic annular thrust body of low elastomechanical hysteresis with magnetostrictive properties, which has mutually parallel end faces subjectable to the force to be measured, and bears a coaxially arranged exciting and measuring winding.

There is known a magnetoelastic force-measuring device according to the generic concept (German Offenlegungsschrift No. 2,365,937), in which the annular thrust body is constructed as a solid ring and has channels which connect its opposite faces with each other and through which the winding is run. If the end faces of the ring, which, for example, can consist of normal steel, magnet steel or ferrite, are subjected hereby to the compressive force to be measured, the change that thereby results in the permeability of the magnetostrictive material of the ring leads to a change in the alternating-current resistance in the winding excited by alternating current, which is a measure for the compressive force acting on the end faces.

Moreover, it is generally known (the German journal: Technisches Messen tm, vol. 5/1985, pages 189 to 198, especially page 192 et seq.), to use magnetoelastic sensors for measuring torques in shafts or as force sensors.

It is an object of the invention to construct a simple magnetoelastic force-measuring device in such a way that a good thermal error compensation is guaranteed in conjunction with a high measuring sensitivity.

Moreover, the device is also to be suitable for nonstop operation under difficult physical and chemical environmental conditions.

This object is achieved with a generic force-measuring device according to the invention by providing an arrangement wherein a metallic sleeved tension body is arranged to fit coaxially in the annular thrust body, said sleeved tension body being likewise of low elastomechanical hysteresis and with magnetostrictive properties and being supported at its one end with an annular flange on the free end face of the annular thrust body which is not supported against an abutment, the other free end being provided with a receiver for introducing the force, wherein the magnetostrictive properties are formed by a thin, homogeneous, uniform, soft-magnetic measuring film, which is applied, on the one hand, to the outer lateral surface of the annular thrust body and, on the other hand, to the inner lateral surface of the sleeved tension body, wherein the exciting and measuring winding of the annular thrust body is constructed as a ring coil, and is arranged on the measuring film on the outer lateral surface of the annular thrust body, and wherein, in its interior, the sleeved tension body likewise bears a ring coil constructed as an exciting and measuring winding, which ring coil is arranged on the measuring film on the inner lateral surface of the sleeved tension body, the two ring coils being connected up to make an inductive half-bridge and being capable of being connected to an electronic apparatus for exciting and evaluating the differential inductance.

Other objects, advantages and novel features of the present invention will become apparent from the following detailed description of the invention when considered in conjunction with the accompanying drawings.

DETAILED DESCRIPTION OF THE DRAWINGS

Figure 1:
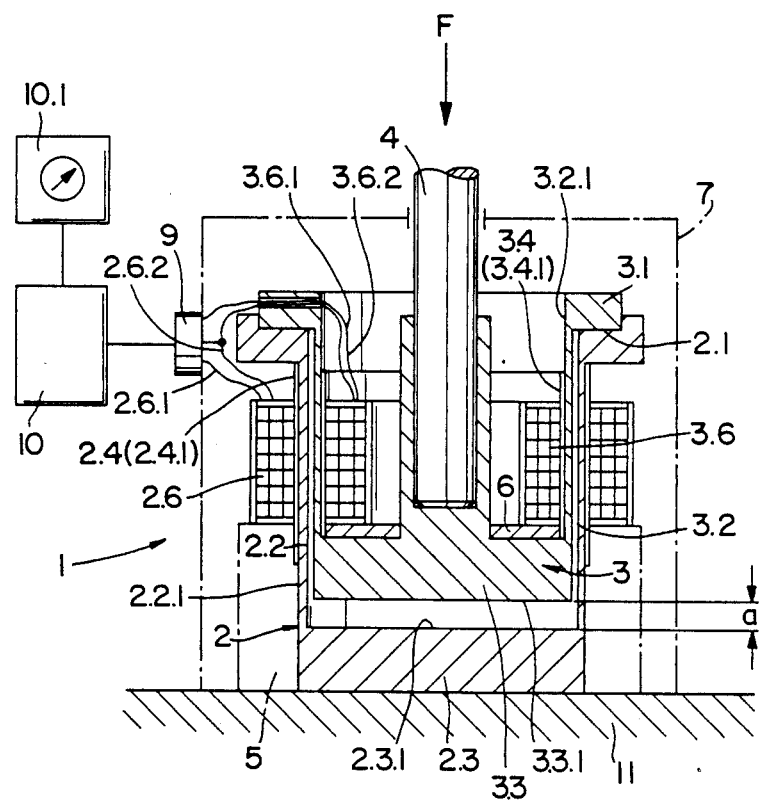
FIG. 1 shows a first illustrative embodiment of a force-measuring device according to the invention, in a schematic representation.

The magnetoelastic force-measuring device 1 represented in the figures includes, in each case, of a metallic annular thrust body 2 and a metallic sleeved tension body 3, which have a low elastomechanical hysteresis in each case.

The annular thrust body 2 is of pot-shaped construction and has an end face 2.1 shaped like an annular flange, and a thin-walled sleeved part 2.2 with an end face 2.3 as the bottom. Likewise, the sleeved tension body 3 is of pot-shaped construction, and has an annular flange 3.1 and a thin-walled sleeved part 3.2 with a receiver 3.3 as the bottom part, which receiver can be connected to a bolt 4 for introducing a force. The sleeved tension body 3 is dimensioned with respect to the annular thrust body 2 in such a way that, on the one hand, the annular flange 3.1 bears against the end face 2.1 as an abutment and for centering, while the end face 3.3.1 of the receiver 3.3 has a predetermined spacing "a" from the bottom face 2.3.1 of the end face 2.3, and, on the other hand, only a small spacing of, for example, 0.5 to 2 mm exists between the outer lateral surface of the sleeved part 3.2 of the sleeved tension body 3, which is inserted coaxially into the sleeved part 2.2 of the annular thrust body 2, and the inner lateral surface of the sleeved part 2.2.

In the illustrative embodiment according to FIG. 1, both the annular thrust body 2 and also the sleeved tension body 3 consist of non-magnetic, elastic high-grade steel, which are provided, in each case, with a thin, homogeneous, uniform soft-magnetic measuring film 2.4 or 3.4 in order to impart magnetostrictive properties. In this connection, the measuring film 2.4 is applied to the outer lateral surface 2.2.1 of the sleeved part 2.2 of the annular thrust body 2, and the measuring film 3.4 is applied to the inner lateral surface 3.2.1 of the sleeved part 3.2 of the sleeved tension body 3.

Figure 2:
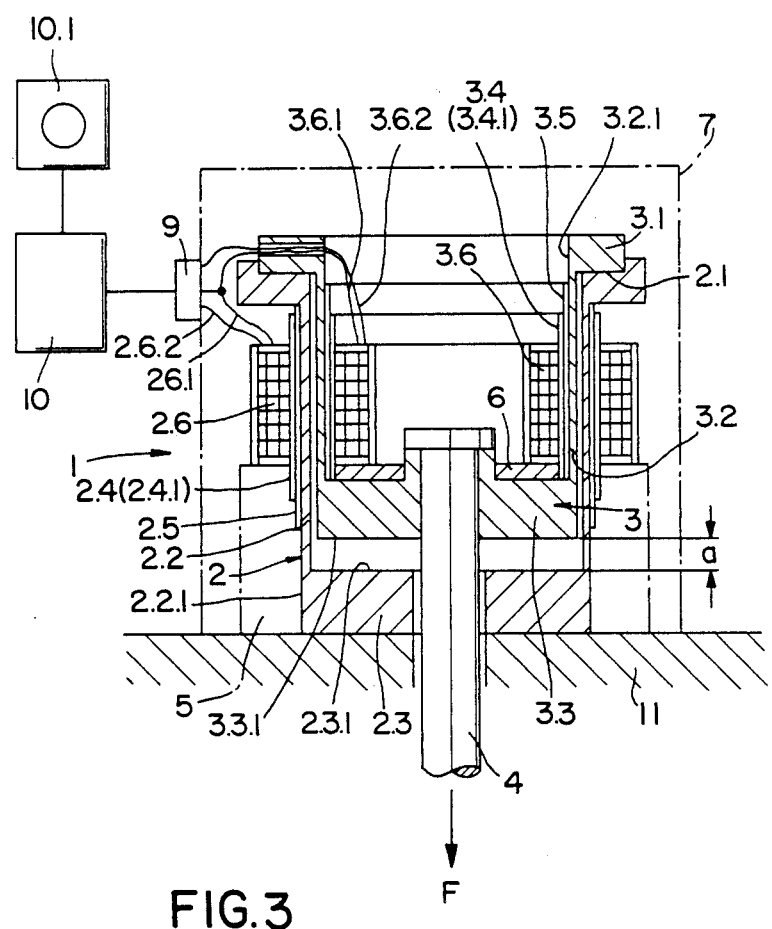
FIG. 2 shows a second illustrative embodiment of a force-measuring device according to the invention, in a schematic representation, in which inter alia the force to be measured is introduced in a way other than in FIG. 1.

By contrast, in the illustrative embodiment according to FIG. 2, both the annular thrust body 2 and also the sleeved tension body 3 consist of partially magnetic or magnetic material. Differing from FIG. 1, in this connection the measuring film 2.4 imparting magnetostrictive properties to the annular thrust body 2 is applied to a non-soft magnetic, non-magnetostrictive intermediate film 2.5 applied to the outer lateral surface 2.2.1 of the sleeved Part 2.2, and the measuring film 3.4 imparting magnetostrictive properties to the sleeved tension body 3 is applied to a non-soft magnetic, non-magnetostrictive intermediate film 3.5 applied to the inner lateral, surface 3.2.1 of the sleeved part 3.2, the intermediate films having the aim, in each case, of magnetically short-circuiting the self-magnetism of the annular thrust body and of the sleeved tension body via this intermediate film.

The measuring films 2.4 and 3.4 consist of a finely crystalline or amorphous metal, especially of a chemically and physically optimized $NiP_x$ film with a phosphorus fraction of less than 7 percent by weight for a film thickness of less than or equal to 100 micrometers. To protect the measuring films against mechanical or chemical damage, these can further be sealed by a non-magnetic, non-magnetostrictive sealing layer 2.4.1 or 3.4.1, which consists of an $NIP_x$ film with a phosphorous fraction of greater than 12 per cent by weight.

All films can be deposited onto their respective substrates chemically or electrically in a simple and inexpensive deposition process, the chemical deposition process being preferably applied because good adhesion, uniformity and homogeneity can be achieved.

Figure 3:
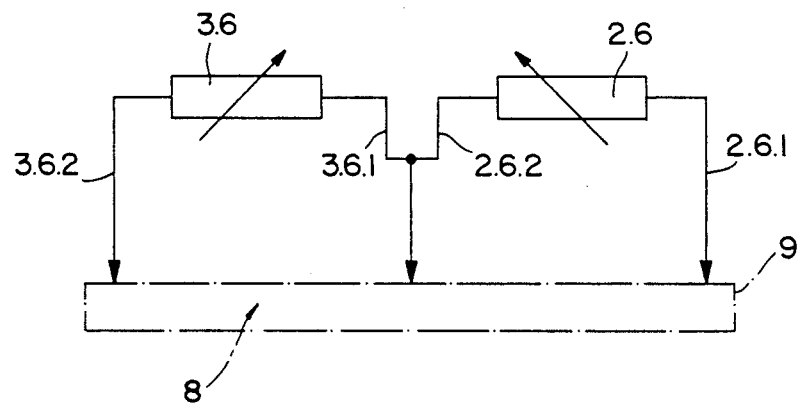
FIG. 3 shows the electrical wiring of the windings used, for the embodiment of FIG. 1 and 2, in a schematic representation.

On the one hand, a ring coil 2.6 is now arranged on the measuring film 2.4 on the outer lateral surface 2.2.1 of the annular thrust body 2, and is supported by a suitable distance piece 5 with respect to the bottom of a housing 7 receiving the device 1. On the other hand, there is arranged in the interior of the sleeved tension body 3 on its measuring film 3.4 applied on the inner lateral surface 3.2.1 a ring coil 3.6 which is supported by a suitable distance piece 6 on the receiver 3.3. In this process, the winding starts and winding ends 2.6.1, 2.6.2 and 3.6.1, 3.6.2 of the two ring coils 2.6, 3.6 are connected up to make an inductive half-bridge 8 according to FIG. 3, and are brought out from the housing 7 via a plug 9 to which can be connected an electronic apparatus 10, 10.1 for exciting and evaluating a differential inductance.

The function of the device is now as follows:

If a tensile force or compressive force F is introduced via the bolt 4 onto the sleeved tension body 3 of the device 1 which is supported and arranged as a whole on an abutment 11 the sleeved part 3.2 of the sleeved tension body 3, and therewith the measuring film 3.4, is strained. Because of the magnetoelastic coupling, this strain ($+\sigma$) causes a change in the magnetic permeability in the magnetostrictive measuring film 3.4, which is converted into a change in inductance $\delta L = L_o + L$ ($+\sigma$) by the ring coil 3.6, which is constantly excited via the electronic apparatus 10, for example by a carrier-frequency hybrid module. Since the sleeved tension body 3 is supported via its annular flange 3.1 on the end face 2.1 of the annular thrust body 2 lying on the abutment 11, the annular thrust body 2 is subjected to a compressive force. Because of the magnetoelastic coupling, the compressive stress ($-\sigma$) thus produced likewise causes a change in the magnetic permeability of the magnetostrictive measuring film 2.4, which is converted into a change in inductance $L = L_o - \delta L$ ($-\delta$) by the ring coil 2.6, which is constantly excited via the electronic apparatus 10. Since the two ring coils 2.6 and 3.6 are connected up to make an inductive half-bridge 8 according to FIG. 3, a doubling of the measuring effect is achieved at the same time as a good compensation of thermal errors, so that the force acting F can be determined very precisely overall.

Moreover, overload protection of the device is possible in a simple way in that the spacing "a" is predetermined in such a way that when use is made of the full measuring range, the end face 3.3.1 of the sleeved tension body 3 bears against the bottom face 2.3.1 of the annular thrust body 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Magnetoelastic force-measuring device comprising a metallic annular thrust body of low elastomechanical hysteresis with magnetostrictive properties, which has mutually parallel end faces subjectable to the force to be measured, and bears a coaxially arranged exciting and measuring winding, wherein a metallic sleeved tension body is arranged to fit coaxially in the annular thrust body, here said sleeved tension body being likewise of low elastomechanical hysteresis and with magnetostrictive properties and being supported at its one end with an annular flange on the free end face of the annular thrust body which is not supported against an abutment, the other free end being provided with a receiver for introducing the force (F), wherein the magnetostrictive properties are formed by a thin, homogeneous, uniform, soft-magnetic measuring film which is applied, on the one hand, to the outer lateral surface of the annular thrust body and, on the other hand, to the inner lateral surface of the sleeved tension body, wherein the exciting and measuring winding of the annular thrust body is constructed as a ring coil and is arranged on the measuring film on the outer lateral surface of the annular thrust body, and wherein, in its interior, the sleeved tension body likewise bears a ring coil constructed as an exciting and measuring winding, which ring coil is arranged on the measuring film on the inner lateral surface of the sleeved tension body, the two ring coils being connected up to make an inductive half-bridge and being capable of being connected to an electronic apparatus for exciting and evaluating the differential inductance.

2. Magnetoelastic force-measuring device according to claim 1, wherein both the annular thrust body and also the sleeved tension body consist of non-magnetic, elastic high-grade steel of low elastomechanical hysteresis.

3. Magnetoelastic force-measuring device according to claim 1, wherein both the annular thrust body and also the sleeved tension body consist of at least partially magnetic material, a non-soft-magnetic, non-magnetostrictive intermediate film being applied in each case to the lateral surface both between the measuring film and the outer lateral surface of the annular thrust body and also between the measuring film and the inner lateral surface of the sleeved tension body 4. Magnetoelastic force-measuring device according to claim 1, wherein the measuring film consists of a finely crystalline metal.

5. Magnetoelastic force-measuring device according to claim 4, wherein the measuring film consists of a chemically and physically optimized $NiP_x$ film with a phosphorus fraction of less than 7 percent by weight for a film thickness of less than or equal to 100 micrometers.

6. Magnetoelastic force-measuring device according to claim 4, wherein the measuring film is applied by a chemical deposition reaction.

7. Magnetoelastic force-measuring device according to claim 4, wherein the measuring film is applied by an electrical deposition reaction.

8. Magnetoelastic force-measuring device according to claim 1, wherein the measuring film consists of an amorphous metal.

9. Magnetoelastic force-measuring device according to claim 8, wherein the measuring film consists of a chemically and physically optimized $NiP_x$ film with a phosphorus fraction of less than 7 percent by weight for a film thickness of less than or equal to 100 micrometers.

10. Magnetoelastic force-measuring device according to claim 8, wherein the measuring film is applied by a chemical deposition reaction.

11. Magnetoelastic force-measuring device according to claim 8, wherein the measuring film is applied by an electrical deposition reaction.

12. Magnetoelastic force-measuring device according to claim 1, wherein the measuring film is sealed with a non-magnetic and non-magnetostrictive sealing film.

13. Magnetoelastic force-measuring device according to claim 12, wherein the sealing film consists of an $NiP_x$ film with a phosphorus fraction of greater than 12 percent by weight.

14. Magnetoelastic force-measuring device according to claim 1, wherein one end face of the receiver of the sleeved tension body has a predetermined spacing (a) from a bottom face of the other end face of the annular thrust body.

15. Magnetoelastic force-measuring device according to claim 1, wherein all components are arranged in a housing.

* * * * *